J. W. ARROWSMITH.
INSTEP SUPPORT OR ARCH PROP.
APPLICATION FILED JAN. 11, 1909.
Reissued Oct. 19, 1909.
13,026.
Fig. 1.
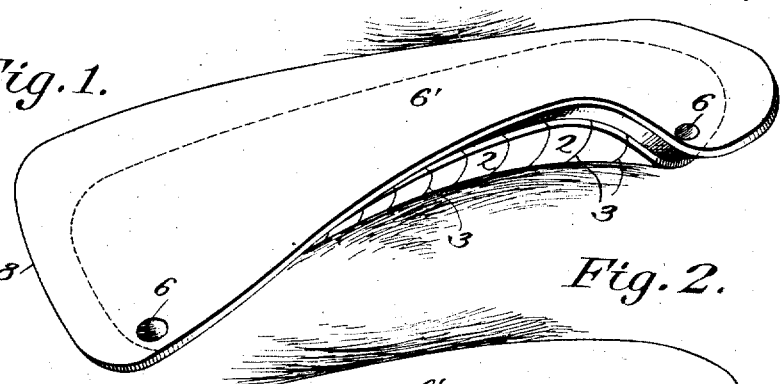
Fig. 2.
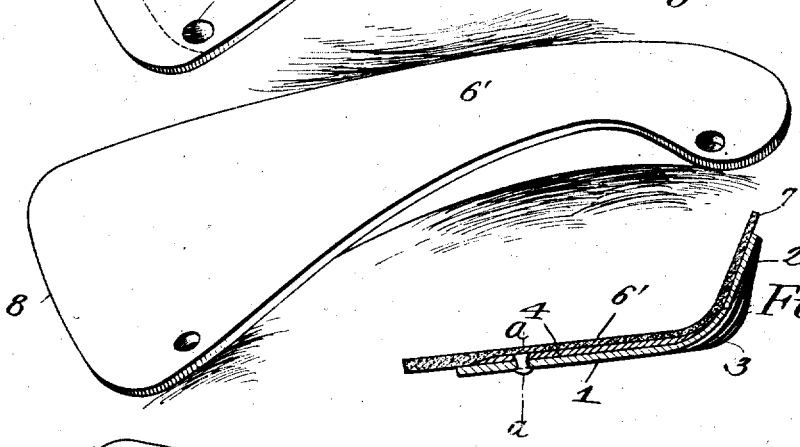
Fig. 5.
Fig. 3.
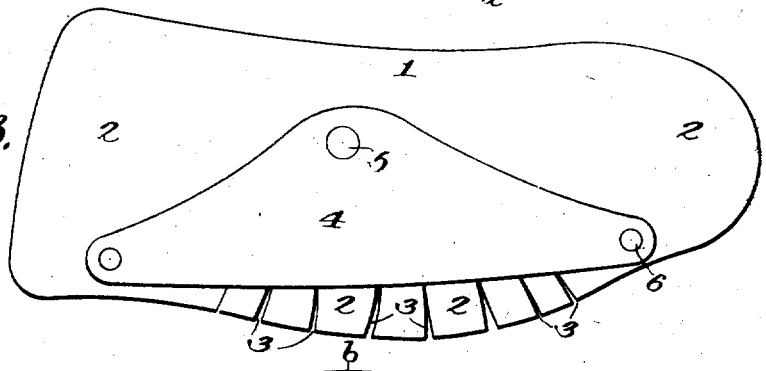
Fig. 4.
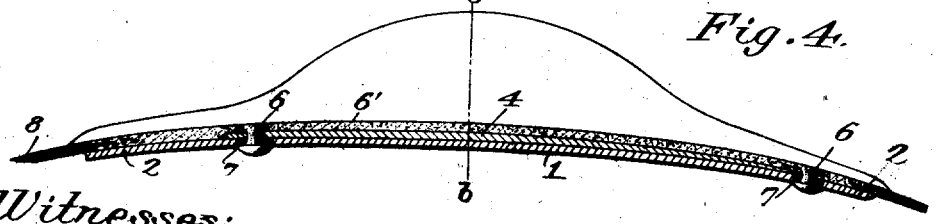
Witnesses:
Annie Cooper
L. B. Trashears
Inventor:
J. W. Arrowsmith
by L. J. Cox
Attorney

UNITED STATES PATENT OFFICE.

JAMES W. ARROWSMITH, OF MORRISTOWN, NEW JERSEY, ASSIGNOR TO ARROWSMITH MANUFACTURING CO., OF CHESTER, NEW JERSEY.

INSTEP-SUPPORT OR ARCH-PROP.

13,026. Specification of Reissued Letters Patent. Reissued Oct. 19, 1909.

Original No. 748,553, dated December 29, 1903, Serial No. 169,621. Application for reissue filed January 11, 1909. Serial No. 471,818.

*To all whom it may concern:*

Be it known that I, JAMES W. ARROWSMITH, a citizen of the United States, residing at Morristown, in the county of Morris, State of New Jersey, have invented certain new and useful Improvements in Instep-Supports or Arch-Props, of which the following is a description, reference being had to the accompanying drawings and to the figures of reference marked thereon.

My invention relates to devices to be worn inside a boot or shoe for the purpose of supporting the instep or arch of the foot, such as is shown and described in the patent issued to me January 6, 1903, No. 717,523, on which the present invention is an improvement.

My present invention has for its object to provide a construction in which the reinforcing-plate may be so connected to the metallic plate which forms the body portion of the instep-support or arch-prop that the ends of the metallic plate may have a slight movement relative to the reinforcing-plate and to further provide the device with a covering of non-metallic material by which the reinforcing plate placed upon the upper surface of the metallic plate forming the body portion of the device may be permitted without discomfort to the user of the device and by which the device may be adapted for use with boots or shoes of different widths and sizes.

In my patent referred to the reinforcing plate is so secured to the surface of the metallic plate forming the body portion of the instep-support or arch-prop that no relative movement of the two parts is permitted. In my present invention the reinforcing-plate is secured to the upper surface of the plate forming the body portion of the instep-support or arch-support and is so connected thereto that a slight movement of the ends of the body portion relative to the reinforcing plate is permitted. In addition the device is provided with a covering of sole-leather or like non-metallic relatively stiff material curved to fit the curve of the upper surface of the metallic portions of the device and serving to protect the foot of the wearer from contact with the metallic portion, and the covering-piece being made of larger area than the metallic portion of the device and being of material easily cut may be trimmed to adapt the device to fit boots or shoes differing considerably in shape and size.

With these objects in view the invention consists in the construction and combination of elements hereinafter described and claimed.

In the drawings, Figure 1 is a perspective view of my improved instep-support or arch-prop having the covering-piece secured thereto. Fig. 2 is a perspective view of the covering piece detached. Fig. 3 is a plan view of the device with the covering piece removed. Fig. 4 is a longitudinal sectional view on line *a a* of Fig. 5, and Fig. 5 is a cross-sectional view on line *b b* of Fig. 4.

Referring in detail to the drawings, the instep-support or arch prop is preferably made of sheet metal, having the rigid body portion 1 curved to fit the under surface of the normal arch of the instep and having the side portion composed of tongues 2, separated by slits 3, to provide a yielding support for the side of the arch of the instep, as in my patent referred to. The reinforcing plate 4 instead of being secured to the underside of the metallic plate forming the body portion 1, as in my patent, is carried on its upper surface. The reinforcing-plate is curved to closely conform to the curvature of the upper surface of the body portion 1 and is of the form shown, having its central portion wider than its ends and having one edge straight from end to end, or approximately so. The reinforcing-plate is so arranged on the body portion 1 that its straight edge overlies the inner ends of the slits 3, which separate the tongues 2, and protects the foot from the irregularities of this portion of the plate as well as strengthening the same. At its widest part, at a point near the edge opposite the straight edge, the reinforcing-plate is rigidly secured to the body portion 1 by a rivet or like fastening device 5. At its ends the reinforcing plate is held in position by rivets or like fastening devices 6 6, passing through slots 7 7 in the body portion 1. By means of the fastening devices 5 6 6 the reinforcing-plate is prevented from turning on the body portion, while at the same time the ends of the reinforcing-plate are permitted a slight movement relative to the ends of the body portion. This permits the curve of the arch of the support to be changed without injury to the fastening means, so that stock sizes of the device may be readily adapted to fit different feet, and adjusted from time to time as may be desired.

6′ is a covering piece of non-metallic material, preferably sole-leather, molded to shape to fit the upper and inner side surface of the instep-support or arch-prop, having the portion which fits against the tongues 2 skived off or thinned, as shown at 7′, so as to be sufficiently flexible to yield outwardly with the tongues. The covering piece is also preferably skived off at its forward end, as shown at 8. The covering piece is secured to the instep-support or arch-prop by the rivets or other fastening devices 6 6 of the top plate 4 at two points only, one near the forward end of the body portion 1 and the other near the heel end, the two fastening devices being located near the edge of the body portion 1 on the side next the side from which the tongues 2 extend upward, or in other words near the line of junction of the body portion and side portion. By this location of the fastening devices the covering-piece is held firmly in position against the metallic plate. The portion lying against the tongues 2 not being secured to the tongues, the resiliency of the tongues is not interfered with and at the same time the covering piece protects the foot of the wearer from injury from the edges of the tongues. The body portion of the covering-piece is of greater area than the body portion 1 of the instep-support or arch-prop, extending beyond the edge of the body portion 1 on the side opposite the tongues 2 and also extending beyond the front and heel ends. The projecting portions may be readily trimmed off to fit the shoe with which the device is to be used, so that one size of instep-support or arch prop may be used in shoes which differ considerably in width and shape, it being necessary for the dealer to carry in stock a comparatively small variety of sizes. The projecting portion of the cover also enables the person fitting the support to the foot to adjust the position of the support to a certain extent longitudinally and laterally, and to place it in the proper position with respect to the foot of the wearer, and the position secured by trimming the projecting portions of the cover will be secured against forward movement by the heads of the rivets 6 6 which will form an indentation or socket in the sole of the shoe. The covering-piece being secured to the support or prop only on a line near the edge of the body portion 1 on the side from which the tongues 2 extend, its opposite edge and body portion is free, and this free edge will adapt itself to the interior of the shoe and form a more comfortable support for the foot than if it were cemented or otherwise secured to the support or prop throughout its surface. This arrangement also permits free access to the plate with tools for the purpose of adjusting it.

The edges of the reinforcing plate 4 are preferably skivered or chamfered off, so that the upper surface of the metallic portion of the device is comparatively free from ridges. The covering-piece being of comparatively thick material serves to protect the foot of the wearer from such ridges as may exist, notwithstanding such skiving or chamfering.

Having thus described my invention, what I claim and desire to secure by Letters Patent, is—

1. In an instep-support or arch-prop the combination of a metallic plate having its body portion curved to fit the under surface of the normal arch of the instep and having its side portion curved to fit the side surface of the normal arch of the instep and consisting of a series of resilient tongues separated by slits, of a reinforcing-plate curved to fit the upper surface of the metallic plate, a non-metallic covering piece molded to fit the upper plate and metallic plate, and fastening means extending through the metallic plate, the reinforcing plate and the covering piece at points near the edge of the body portion on the side from which the tongues extend upward; substantially as described.

2. In combination with a metallic instep-support or arch-prop having its body portion curved to fit the under surface of the normal arch of the instep and having its side portion curved to fit the side surface of the normal arch of the instep and consisting of a series of resilient tongues separated by slits, of a non-metallic covering-piece molded to fit the upper surface of the support or prop, and secured thereto at points near the edge of the body portion on the side from which the tongues extend upward, the portion of the covering-piece lying against the resilient tongues being free; substantially as described.

3. In an instep-support or arch-prop, the combination of a metallic plate having its body portion curved to fit the under surface of the normal arch of the instep, and having its side portion curved to fit the side surface of the normal arch of the instep, of a non-metallic covering-piece molded to fit the upper surface of the metallic plate, and a reinforcing-plate rigidly secured near its middle to the metallic plate, and fastening means extending through the covering piece, the metallic plate and the reinforcing-plate at points near the line of junction of the body portion and side portion of the metallic plate, the metallic plate being provided with slots to receive the fastening means; substantially as described.

4. In combination with a metallic support or arch prop having its body portion curved to fit the under surface of the normal arch of the instep, and having its side portion curved to fit the side surface of the normal arch of the instep, of a non-metallic covering piece molded to fit the upper surface of the support or prop, and secured thereto at points near the line of junction of the body portion and side portion, the portions of the covering-piece lying against the body portion and against the side portion being free, and a plate of smaller area between the metallic support and the non-metallic covering piece secured thereto at the same point at which the cover and the metallic support are connected; substantially as described.

5. In combination with a metallic instep-support or arch-prop having its body portion curved to fit the under surface of the normal arch of the instep, and having its side portion curved to fit the side surface of the normal arch of the instep, of a non-metallic covering piece molded to fit the upper surface of the support or prop, and secured thereto at points near the line of junction of the body portion and side portion, the portion of the covering piece lying against the body portion and against the side portion being free, and a reinforcing plate of smaller area than said body portion of the support, extending longitudinally thereof and secured thereto by fastening means extending therethrough and through the main plate and covering piece at the said points near the line of junction.

JAMES W. ARROWSMITH.

Witnesses:
FRANK F. CUMMINGS,
G. W. HOPPING.